United States Patent [19]
Yu et al.

[11] 4,206,296
[45] Jun. 3, 1980

[54] POLYESTER COMPOSITION CONTAINING A BENZENE PHOSPHORUS OXYDICHLORIDE, A DIPHENOL AND POCL$_3$

[75] Inventors: Arthur J. Yu, Stamford, Conn.; Siegfried Altscher, Monsey; Ki S. Kim, Irvington, both of N.Y.

[73] Assignee: Stauffer Chemical Company, Westport, Conn.

[21] Appl. No.: 613,142

[22] Filed: Sep. 15, 1975

[51] Int. Cl.$^2$ .................. C08L 67/02; C08L 81/00; C08L 85/02
[52] U.S. Cl. .................. 525/437; 525/534; 528/167; 528/171
[58] Field of Search .................. 260/860, 49, 47 P; 525/437

[56] References Cited

U.S. PATENT DOCUMENTS

| | | | |
|---|---|---|---|
| 2,716,101 | 8/1955 | Coover et al. | 260/47 P |
| 3,664,974 | 5/1972 | Cohen et al. | 260/860 |
| 3,719,727 | 3/1973 | Masai et al. | 260/860 |

*Primary Examiner*—Wilbert J. Briggs, Sr.
*Attorney, Agent, or Firm*—Richard P. Fennelly

[57] ABSTRACT

Polyester compositions containing an effective amount for flame retardancy of a copolymer of (1) benzene phosphorus oxydichloride, (2) 2,4'-thiodiphenol, 4,4'-thiodiphenol, 2,4'-sulfonyl diphenol, 4,4'-sulfonyl diphenol or mixtures thereof, and (3) POCl$_3$ are disclosed.

9 Claims, No Drawings

POLYESTER COMPOSITION CONTAINING A BENZENE PHOSPHORUS OXYDICHLORIDE, A DIPHENOL AND POCL$_3$

TECHNICAL DESCRIPTION OF THE INVENTION

The present invention relates to a flame retardant polyester composition.

In U.S. Pat. No. 2,716,101 to H. W. Coover Jr., et al. a three component copolymer of a dihydroxy aromatic compound, e.g., a dihydroxydiphenyl sulfone, an organo-phosphonic acid dichloride, e.g., benzenephosphonyl dichloride, and a trifunctional phosphorus compound, e.g., phosphorus oxychloride, is proposed. The utility for such copolymers is taught as residing in the production of non-flammable fibers, rubbers, molding compositions, and the like. Their use in polyester compositions as an additive was not suggested. More recently, in U.S. Pat. No. 3,719,727 to Masai et al. a two-component copolymer of a dihydroxydiphenyl sulfone, and an organo-phosphonic dichloride or dibromide was proposed for use as a flame retardant additive in polyesters. That recent patent stated that a polymer containing a sulfonyl group in its molecular chain had better fireproofing characteristics than polymers without a sulfonyl group and cautioned against using certain phosphorus compounds, namely the esters of phosphoric acid, phosphorus acid, and phosphonic acid since these compounds lead to ester exchange reactions between the polyester and phosphorus ester thereby lowering the polymerization degree and melt viscosity of the polyester.

The present invention relates to use of three components copolymers which contain a moiety derived from a trifunctional phosphorus compound and which unexpectedly gives a polyester having an intrinsic viscosity which is comparable or greater to that exhibited by the polyester composition described in U.S. Pat. No. 3,719,727 to Masai et al. The embodiment of the present invention wherein, 4,4'-thiodiphenol is used in the copolymer additive unexpectedly has equivalent or slightly better flame retardance than the copolymer additive containing 4,4'-sulfonyl diphenol.

The molar ratio of benzene phosphorus oxydichloride to POCl$_3$, which are reacted together with the diphenol to form the copolymers which are used in the polyester composition of the present invention can range from about 100:1 to about 1:100, preferably from about 50:1 to about 1:50. The molar ratio of 4,4'-thiodiphenol, 2,4'-thiodiphenol, 4,4'-sulfonyl-diphenol, 2,4'-sulfonyldiphenol or mixtures thereof to benzene phosphorus oxydichloride and POCl$_3$ which are reacted to form the copolymers described herein should be from about 1:1.2 to about 1.8:1, preferably from about 1:1 to about 1.5:1. Preferably at least about 50% or more of the diphenol component is a thiodiphenol. It is most preferred to use the reagents such that the equivalence of chlorine in the POCl$_3$ and oxydichloride compounds is stoichiometrically about equal to the equivalence of hydroxyl groups in the diphenol. The final copolymer will contain moieties derived from the foregoing reactants in the same general amounts.

A number of processes can be used to make the copolymers which are used in the polyester composition of the present invention. For example, any of the above described amounts of the three reactants can be reacted in the absence of either solvent or catalyst at elevated temperatures of from about 120° C. to about 250° C. until a homogeneous melt is produced. This reaction has the disadvantage that it is quite slow, taking several days to complete, and it yields a product which may be of a dark color which contains undesired residual hydrochloric acid which can cause chain degradation in the copolymer.

Another procedure which can be used is the same general reaction sequence which is described in U.S. Pat. No. 2,716,101 to H. W. Coover, Jr. et al. In this procedure, the monomers, as described above, are reacted in the presence of a catalytically effective amount of a suitable anhydrous alkaline earth halide condensation catalyst, e.g., anhydrous magnesium chloride, at a temperature of from about 90° C. to about 300° C. If desired, this reaction can be carried out in a suitable inert solvent.

The procedure which is preferred for purposes of the present invention is the reaction of the above monomers in the above-described amounts at much lower temperatures, e.g., from about 0° C. to about 80° C. in solution and in the presence of an amount of an acid acceptor which is sufficient to scavenge the hydrochloric acid by-product which is produced by the reaction of the monomers. Generally, a molar amount of amine acid acceptor which ranges from about 2:1 to 3:1, based on the molar amount of the reacting benzene phosphorus oxydichloride or diphenol monomers is sufficient. The solvent which is selected is preferably an inert organic solvent, most preferably a chlorinated hydrocarbon solvent, which will not interfere with the reaction and in which the intermediates and product are soluble. Suitable solvents include methylene chloride, chloroform, dichloroethane and the like.

The amine acid acceptor can be any of the $C_1$–$C_8$ trialkyl or branched dialkyl monoamines or the heterocyclic amines. Preferred acid acceptors are the $C_1$–$C_8$ trialkylamines. Some representative amines are triethylamine, pyridine, diisopropylamine and the like.

The copolymers used in the polyester composition of this invention have an intrinsic viscosity which ranges from about 0.30 to about 1.1, preferably from about 0.35 to about 0.70, in a 60/40, weight ratio, phenyl/tetrachloroethane mixture at 30° C. Their melting point is about 170° C. to about 195° C.

The types of polyester with which the above described copolymers find use are those well-known, normally flammable polyesters including polybutylene terephthalate, polyethylene terephthalate, poly-1,4-cyclohexylidenedimethylene terephthalate, polyethylene sebacate, polyethylene adipate, and the like.

The amount of the copolymer which is added should be an effective amount for the degree of flame retardancy required. Generally, from about 0.4% to about 20%, preferably from about 5% to about 15%, by weight of the polyester composition, of copolymer is used.

The same methods described in U.S. Pat. No. 3,719,727 to Masai et al. for incorporation of the sulfonyl containing two-component copolymer additives described therein in a polyester composition can be used in forming the polyester compositions of the present invention. Preferably, the copolymer is incorporated in the polyester under molten conditions and the mixture is used to make either pellets or fibers utilizing techniques well known to persons of ordinary skill in the art.

These and other embodiments of the claimed invention are illustrated by the Examples which follow:

EXAMPLE 1

This Example describes a procedure for forming a copolymer of benzene phosphorus oxydichloride, 4,4'-thiodiphenol and $POCl_3$ (hereinafter called "BPOD/TDP/$POCl_3$" copolymer) which can be used in the polyester compositions of the present invention.

A three necked flask with a mechanical stirrer, addition funnel and condenser were used. The following reagents were charged into the flask:

| Reagent | Amount |
| --- | --- |
| 4,4'-thiodiphenol | 89.8 g. (0.412 mole) |
| Triethylamine | 88.8 g. (0.88 mole) |
| Methylene chloride | 600 ml. |

The following reagents were placed in the addition funnel:

| Reagent | Amount |
| --- | --- |
| Benzene phosphorus oxydichloride | 78.0 g. (0.40 mole) |
| $POCl_3$ | 1.22 g. (0.008 mole) |
| Methylene chloride | 250 ml. |

The benzene phosphorus oxydichloride was slowly added to the flask over a period of 20–30 minutes with rapid stirring at room temperature. The stirring was continued for one hour after the addition had been completed, and the resulting solution was washed with an equal volume of 1N hydrochloric acid and an equal volume of distilled water. The solution was added to methanol to yield the desired product as a precipitate. The precipitate was removed from solution and was vacuum dried.

The relative viscosity of the product was 1.92 when measured as a 1% by weight solution in a 60/40 by weight phenol/tetrachloroethane mixture. The yield of product was 90%. It had an intrinsic viscosity of 0.65 when measured in a 60/40 phenol/tetrachloroethane mixture, and a melting point of about 18° C.

EXAMPLE 2

The same procedure used in Example 1 was again used to form a copolymer of benzene phosphorus oxydichloride, 4,4'-sulfonyldiphenol and $POCl_3$, as described in U.S. Pat. No. 2,716,101 to H. W. Coover Jr. et al. This polymer is hereinafter abbreviated "BPOD/SDP/$POCl_3$" copolymer. The reagents in the flask were:

| Reagent | Amount |
| --- | --- |
| 4,4'-sulfonyl diphenol | 65.38 g. (0.2575 mole) |
| Triethylamine | 55.5 g. (0.55 mole) |
| Methylene chloride | 400 ml. |

The reagents in the addition funnel were:

| Reagent | Amount |
| --- | --- |
| Benzene phosphorus oxydichloride | 48.75 g. (0.25 mole) |
| $POCl_3$ | 0.77 g. (0.005 mole) |
| Methylene chloride | 100 ml. |

The yield of product was 94%, it had an intrinsic viscosity of 0.42 when measured in a 60/40 phenol/tetrachloroethane mixture, and a melting point of 185°–190° C.

EXAMPLE 3

Examples 1 and 2 were repeated using a higher amount of $POCl_3$ so as to yield copolymers having a 2 mole % content of $POCl_3$ based on the molar sum of all three reactants. The amount of $POCl_3$ used in Examples 1 and 2 was 1 mole %.

The copolymers produced in this Example were tested for flammability using the Limiting Oxygen Index (LOI) ASTM D-2863 test which is described by Fenimore and Martin in the November, 1966 issue of Modern Plastics. This method directly relates to the minimum percentage concentration of oxygen in an oxygen-nitrogen mixture which permits a sample to burn. A higher LOI is indicative of a higher degree of flame retardancy. The following LOI values were observed and demonstrate the greater flame retardancy for the product of the present invention.

| Sample | LOI | MP(°C.) | $T_g$(°C.) |
| --- | --- | --- | --- |
| BPOD/TDP/$POCl_3$ copolymer | 60 | 180 | 88 |
| BPOD/SDP/$POCl_3$ copolymer | 50 | 190 | 151 |

EXAMPLE 4

This Example shows the flame retardancy of polyester compositions containing the BPOD/TDP/$POCl_3$ and BPOD/SDP/$POCl_3$ copolymers described herein.

Samples of compositions containing 93%, by weight, of a commercial polybutylene terephthalate (Valox 310, General Electric Co., Engineering Polymers Products Dept.) and 7%, by weight, of the two products shown in Example 3 were prepared. The procedure involved melting each of the respective polymers and polyester in separate oil baths at 290° C. under nitrogen, mixing the respective polymers and polyester and then drawing the mixture with a ¼" diameter glass rod through a Teflon fluorocarbon tube.

The resulting polyester compositions were tested using the above-described LOI test. The following results were obtained:

| Polyester Containing: | LOI | MP(°C.) |
| --- | --- | --- |
| BPOD/TDP/$POCl_3$ copolymer | 30 | 220 |
| BPOD/SDP/$POCl_3$ copolymer | 29 | 220 |

EXAMPLE 5

The same procedure used in Example 1 was again used to form a copolymer of benzene phosphorus oxydichloride, a mixture of 4,4'-thiodiphenol and 4,4'-sulfonyl diphenol in a molar ratio of 1:1 and $POCl_3$ which copolymer can be used in the polyester compositions of the present invention.

A three necked flask with a mechanical stirrer, addition funnel and condenser were used. The following reagents were charged into the flask:

| Reagent | Amount |
| --- | --- |
| 4,4'-sulfonyl diphenol | 32.7 g. (0.1288 mole) |
| 4,4'-thiodiphenol | 28.05 g. (0.1288 mole) |
| Triethylamine | 55.5 g. (0.55 mole) |

| Reagent | Amount |
|---|---|
| Methylene chloride | 400 ml. |

The following reagents were placed in the addition funnel:

| Reagent | |
|---|---|
| Benzene phosphorus oxydichloride | 48.75 g. (0.25 mole) |
| POCl₃ | 0.77 g. (0.005 mole) |
| Methylene chloride | 100 ml. |

The yield of the product was 90%, it had an intrinsic viscosity of 0.38 in a 60/40 phenol/tetrachloroethane mixture. The melting point of the copolymer is 170°–175° C. and the glass transition temperature is 118° C.

EXAMPLE 6

The same procedure used in Example 1 was again used to form a copolymer of benzene phosphorus oxydichloride, a mixture of 2,4'-sulfonyl diphenol and 4,4'-sulfonyl diphenol in a molar ratio of 86 to 14 and POCl₃, which copolymer can be used in the polyester compositions of the present invention.

A three necked flask with a mechanical stirrer, addition funnel and condenser were used. The following reagents were charged into the flask:

| Reagent | |
|---|---|
| A mixture of sulfonyl diphenols consisting of 14% 2,4'-isomer and 86% 4,4'-isomer | 171.8 g. (0.0684 mole) |
| Triethylamine | 151.0 g. (1.50 mole) |
| Methylene chloride | 900 ml. |

The following reagents were placed in the addition funnel:

| Reagent | |
|---|---|
| Benzene phosphorus oxydichloride | 130 g. (0.667 mole) |
| POCl₃ | 2.0 g. (0.013 mole) |

The yield of the product was 94%, it had an intrinsic viscosity of 0.36 when measured in a 60/40 phenol/tetrachloroethane mixture, and a melting point of 190°–195° C.

What is claimed:

1. A polyester composition containing an effective amount for flame retardancy of a copolymer of (1) benzene phosphorus oxydichloride, (2) a diphenol selected from the group consisting of 4,4'-thiodiphenol, 2,4'-thiodiphenol, a mixture of sulfonyl diphenol and thiodiphenol, and mixtures thereof, and (3) POCl₃.

2. A composition as claimed in claim 1 wherein the polyester is selected from the group consisting of polybutylene terephthalate, polyethylene terephthalate, poly-1,4-cyclohexlidenedimethylene terephthalate, polyethylene sebacate and polyethylene adipate.

3. The composition of claim 1 wherein the amount of copolymer is from about 0.4% to about 20%, by weight, of the polyester.

4. The composition of claim 1 wherein the amount of copolymer is from about 5% to about 15%, by weight, of the polyester.

5. The composition as claimed in claim 1 wherein the molar ratio of benzene phosphorus oxydichloride to POCl₃ ranges from about 100:1 to about 1:100.

6. The composition as claimed in claim 5 wherein the molar ratio is from about 50:1 to about 1:50.

7. The composition as claimed in claim 1 wherein the molar ratio of diphenol to oxydichloride and POCl₃ ranges from about 1:1.2 to about 1.8:1.

8. The composition as claimed in claim 7 wherein the molar ratio ranges from about 1:1 to about 1.5:1.

9. The composition as claimed in claim 1 wherein the molar ratio of benzene phosphorus oxydichloride to POCl₃ ranges from about 50:1 to about 1:50 and the molar ratio of diphenol to oxydichloride and POCl₃ ranges from about 1:1.2 to about 1.8:1.

* * * * *

UNITED STATES PATENT AND TRADEMARK OFFICE
CERTIFICATE OF CORRECTION

PATENT NO. : 4,206,296
DATED : June 3, 1980
INVENTOR(S) : Arthur J. Yu et al.

It is certified that error appears in the above-identified patent and that said Letters Patent are hereby corrected as shown below:

Col. 1, lines 34-35, "components" should be -- component --; and

Col. 3, line 43, "18°C." should be -- 180°C. --.

Signed and Sealed this

Thirtieth Day of September 1980

[SEAL]

Attest:

SIDNEY A. DIAMOND

Attesting Officer

Commissioner of Patents and Trademarks